Patented Mar. 10, 1942

2,276,192

UNITED STATES PATENT OFFICE 2,276,192

HYDROGENATION OF FORMALDEHYDE

William E. Hanford and Richard S. Schreiber, Wilmington, Del., assignors to E. I. du Pont de Nemours & Company, Wilmington, Del., a corporation of Delaware No Drawing. Application August 25, 1938, Serial No. 226,731

9 Claims. (Cl. 260—635)

This invention relates to catalytic hydrogenation processes, and more particularly to a process for catalytically hydrogenating formaldehyde in the presence of a solvent.

Formaldehyde has heretofore been catalytically hydrogenated but in these prior processes the hydrogenation has been successful only if amounts of catalyst ranging from 50 to 100% based on the weight of the formaldehyde, were used. We have now discovered that formaldehyde can be successfully hydrogenated without this excessive catalyst consumption characteristic of prior processes, if the hydrogenation reaction is carried out at a pH in excess of six.

This invention has as one object the provision of a catalytic process for hydrogenating formaldehyde without excessive catalyst consumption. Another object is to provide a practical process for removing free formaldehyde from reaction mixtures containing same. Still another object is to carry out the simultaneous condensation and hydrogenation of formaldehyde. Other objects will appear hereinafter.

The above and other objects may be accomplished by the following invention which comprises adjusting the pH of the medium containing the formaldehyde to a value in excess of six and catalytically hydrogenating under conditions which provide for maintaining the pH in excess of six throughout the hydrogenation reaction.

In order to illustrate this invention more specifically there are given below examples which set forth certain well defined instances of its application. These examples, however, are not to be considered as limitative as many modifications may be made therefrom without departing from the spirit and the scope of this invention.

Example I

Thirty grams of paraformaldehyde were suspended in 30 grams of water and the mixture heated to 90° C. for a few minutes when 5 grams of magnesium carbonate were added, and the solution hydrogenated at 130° C. using 5 grams of nickel-on-kieselguhr catalyst and a hydrogen pressure of 9000 pounds per square inch. The initial pH of the solution was 8.8 and the final pH 6.7. After one hour, the formaldehyde was found to be completely hydrogenated under these conditions.

Example II

Thirty grams of paraformaldehyde were suspended in 100 grams of methanol which contained 10 grams of water and 2 cc. of pyridine. The solution was warmed to approximately 60° C. and then hydrogenated at 150° C., using 10 grams of Raney nickel catalyst and a hydrogen pressure of 2000 to 3000 pounds per square inch. At the end of three hours the hydrogenation was discontinued, and it was found that the formaldehyde had completely disappeared. The initial pH of the solution was approximately 9.5 and the final pH 6.4. Distillation of the hydrogenation products yielded 21 grams of methanol and 0.9 grams of material boiling in the range of ethylene glycol.

Example III

Three hundred grams of paraformaldehyde were suspended in 300 grams of water and the mixture warmed to 80° C. when 2 cc. of 10% sodium hydroxide solution were added. The temperature of the reaction mixture was then raised to 99° C. when 66 cc. of a solution containing 26 grams of enediols was added. When the temperature again reached 99° C., 6 grams of lead oxide were added, and 10% sodium hydroxide at such a rate as to maintain a pH of 7 during the entire run. Immediately after the addition of the lead oxide catalyst, a vigorous reaction set in and external heating was discontinued. When 82% of the formaldehyde was polymerized, further reaction was prevented by chilling the solution and adding 2 cc. of concentrated sulfuric acid dissolved in 10 cc. of water. The time required for achieving this degree of polymerization under these conditions was approximately 12 minutes. The amount of 10% sodium hydroxide added to maintain a pH of 7 was approximately 90 cc. The precipitated lead sulfate was removed by filtration and the filtrate was made neutral to litmus with 10% sodium hydroxide. An aliquot of this solution containing 100 grams of the original formaldehyde was hydrogenated at 120° C., using thirty grams of Raney nickel catalyst and a hydrogen pressure of 2000 to 3000 pounds per square inch. After four hours the mixture was completely hydrogenated, as indicated by its inertness to hot Fehling's solution and negative tests for formaldehyde. After the removal of the nickel catalyst by filtration the resulting solution was distilled at atmospheric pressure yielding 11 grams of methanol. The concentrate which approximated 200 cc. was then distilled under reduced pressure to remove the ethylene glycol which boils at 83° to 88° C. at 5 to 6 mm. pressure. The residue, which was quite viscous and showed a pronounced tendency to foam, was absorbed on asbestos and steam-distilled at 140° to 160° C. under a pressure of 30 mm. Such a treatment for three hours completely removed the glycerol and erythritol, which were collected by condensing the distillate. The aqueous distillate was concentrated in 100 cc. at atmospheric pressure, and the concentrate fractionally distilled at 5 to 6 mm. pressure to separate the glycerol and erythritol which boiled at 150° to 158° C. and 190° to 215° C., respectively, at this pressure. The yields of polyhydric alcohols obtained in this manner were as follows:

| Polyhydric alcohol | Grams | Per cent yield |
|---|---|---|
| Ethylene glycol | 12.0 | 14.6 |
| Glycerol | 22.5 | 27.4 |
| Erythritol | 13.0 | 16.0 |
| Higher polyhydric alcohols | 34.5 | 42.0 |

Example IV

Twenty grams of paraformaldehyde were dissolved in 80 cc. of methanol and 10 cc. of water by warming to 50° C. with a trace of sodium hydroxide. The solution was cooled to room temperature, treated with 20 grams of zinc hydroxide, and hydrogenated at 125° C., using 10 grams of Raney nickel catalyst and a hydrogen pressure between 2000 and 3000 pounds per square inch. After 2 hours the hydrogenation reaction was stopped, and it was found that approximately 0.5 mol of hydrogen had been absorbed. Analysis indicated that about 70% of the formaldehyde had been hydrogenated.

Example V

Thirty grams of paraformaldehyde were suspended in 30 grams of water and the mixture heated to 90° C. for several minutes. At this point 5 grams of magnesium carbonate were added and the solution hydrogenated for one hour at 50° C., using 5 grams of Raney nickel catalyst and a hydrogen pressure of 9000 pounds per square inch. The initial pH of the solution was 8.9 and the final pH 6.8. Analysis of the solution showed that 60% of the formaldehyde had been hydrogenated.

Example VI

Thirty grams of paraformaldehyde were suspended in 30 grams of methanol and the suspension warmed to 60° C. with one gram of magnesium carbonate. The solution was then hydrogenated at 130° C. and 9000 pounds per square inch pressure, using 5 grams of nickel-on-kieselguhr catalyst. The hydrogenation was discontinued after one hour, and analysis indicated that 90% of the formaldehyde had been hydrogenated.

Example VII

One hundred grams of paraformaldehyde were suspended in 100 grams of methanol and the mixture heated to reflux. At the start the solution began to reflux at approximately 70° C., but as heating continued the temperature gradually rose until approximately 95° C. was reached. At this point, when no further increase in the temperature of the solution was noted, 20 grams of powdered calcium oxide were added, the solution agitated vigorously, and refluxed by warming on a water bath. After approximately 80 minutes the temperature had fallen to 82° C., at which point it was determined that approximately 15% of the formaldehyde had disappeared. The mixture was then chilled to 25° C., 25 grams of nickel-on-kieselguhr catalyst added, and immediately hydrogenated at 130° C. using a hydrogen pressure of 2000 to 3000 pounds per square inch. Analysis of the solution, after removal of the catalyst, showed it to be free of aldehydes or ketones. The hydrogenated solution was filtered, concentrated, and distilled under reduced pressure yielding methanol, ethylene glycol, glycerol, and a small amount of erythritol.

Although in the foregoing examples paraformaldehyde has been used, it is to be understood that the process of this invention is generically applicable to the hydrogenation of any solution which contains free formaldehyde, or which is capable of liberating formaldehyde under the hydrogenating conditions.

In the examples water and methanol have been used as solvents, but it is to be understood that the use of any other solvent in place thereof is contemplated and included within the scope of this invention. Among such alternative solvents are dioxan, ethylene glycol, ethanol, glycerol, benzene, cyclohexane, decahydronaphthalene, etc. For reasons of economy and ease of operation it is preferred, however, to use water or methanol as the solvents.

Any hydrogenating catalyst in the massive or pulverulent form, whether supported on supports as kieselguhr, silica gel, etc., or not may be used in place of the nickel catalysts of the examples. Among such catalysts are metallic cobalt and the chromites and oxides of hydrogenating metals such as cobalt, nickel, copper, etc. The amount of catalyst may vary from about 1% to about 20% based on the formaldehyde employed, but it is generally preferred to use from about 1% to about 10% based on the weight of the formaldehyde present. In order to determine the specific amount of catalyst to be used for the most efficient operation of the process, important factors to be considered are the conditions of hydrogenation, the type of catalyst employed, and the pH of the solution being hydrogenated; generally, the more alkaline the solution the easier the hydrogenation reaction.

Temperatures of 20° C. and above are suitable for this process, but it is preferred to operate at temperatures below 175° C. The preferred range is from 50° C. to 150° C.

Pressures greater than 450 pounds per square inch are suitable for this process, but it is generally preferred to use pressures in the range of 3000 to 9000 pounds per square inch. In general, increased pressures greatly facilitate the hydrogenation of formaldehyde and for that reason it is preferred to operate at as high a pressure as possible.

As regulators for the pH during the hydrogenation reaction, any alkaline material of organic or inorganic origin may be used. For this purpose it has been found that such materials as pyridine, dimethylamine, triethanolamine, zinc hydroxide, magnesium oxide, calcium oxide, lead oxide, magnesium carbonate, sodium hydroxide, sodium formate, sodium bicarbonate, potassium and sodium acetates, disodium phosphate, monosodium phosphate, and sodium carbonate are satisfactory. In the operation of a batch process it is preferable that sufficient pH regulator be added so as to maintain a pH in excess of six for the duration of the hydrogenation reaction. If desired, however, the pH regulator may be added at intervals or continuously during the hydrogenation reaction since it is merely essential for the successful operation of the process described herein that the pH be maintained in excess of six throughout the hydrogenation step. The preferred range at which to carry out the hydrogenation is from a pH of six to a pH of nine.

It is well known that a number of otherwise commercially possible processes have not been practical because no satisfactory method for removing free formaldehyde has been available. Up to the present all attempts to remove formaldehyde by simple physical means such as distillation, extraction, etc., have not proved entirely satisfactory. Simple hydrogenation offers a solution for this problem, but, due to the large catalyst consumption this method has not heretofore been economically feasible. Since this disadvantage is overcome by the present invention, it is evident that it is an important contribution to the art. This invention is also important because it offers a practical route to alcohols directly from formaldehyde.

The term "enediol" is used herein to refer to compounds having the grouping

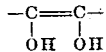

or compounds which are capable of enolizing, hydrolizing, or rearranging to give products having such a grouping. Among such products are glucose, ascorbic acid, fructose, benzoin, glycolic aldehyde, glyceric aldehyde, dihydroxyacetone, and the mixture of hydroxy-aldehydes and ketones produced by partial condensation of formaldehyde which consist essentially of glycolic and glyceric aldehydes, tetroses, hexoses, etc., along with some unchanged formaldehyde.

It is apparent that many widely different embodiments of this invention may be made without departing from the spirit and scope thereof. It is to be understood, therefore, that this invention is not intended to be limited in any way, except as indicated by the appended claims.

We claim:

1. In the process of catalytically hydrogenating formaldehyde, the step of carrying out the hydrogenation at a pH in excess of six.

2. The process which comprises catalytically hydrogenating formaldehyde in the liquid phase and in solution in a solvent, while maintaining a pH in excess of six throughout the hydrogenation reaction.

3. In the process of catalytically hydrogenating formaldehyde, the improvement which comprises the step of carrying out the reaction under alkaline conditions.

4. The process which comprises catalytically hydrogenating a formaldehyde solution having a pH in excess of six in the presence of a hydrogenating catalyst in an amount varying from about 1% to about 10% by weight of the formaldehyde content of the solution.

5. The process of claim 3 characterized in that the alkaline material is pyridine.

6. The process in accordance with claim 2 characterized in that the hydrogenation is carried out at a temperature between 20° C. and 175° C. and at a pressure in excess of 450 pounds per square inch.

7. The process in accordance with claim 2 characterized in that the hydrogenation is carried out at a pressure in excess of about 2000 pounds per square inch, at a temperature of about 125° C., and at a pH controlled throughout the hydrogenation step in excess of six.

8. The process of claim 2 characterized in that the hydrogenation is carried out in the presence of magnesium carbonate.

9. The process in accordance with claim 2 characterized in that the hydrogenation reaction is carried out using nickel as the hydrogenation catalyst.

WILLIAM E. HANFORD.
RICHARD S. SCHREIBER.